Sept. 10, 1940.   C. WOODY   2,214,395

LINE GUIDE COPYHOLDER MEASURE

Filed July 25, 1938

Inventor
Covel Woody

By R. M. Thomas
Attorney

Patented Sept. 10, 1940

2,214,395

UNITED STATES PATENT OFFICE 2,214,395

LINE GUIDE COPYHOLDER MEASURE

Covel Woody, Ogden, Utah, assignor of twenty-five per cent to C. W. Guernsey, Ogden, Utah Application July 25, 1938, Serial No. 221,119

3 Claims. (Cl. 33—107)

My invention relates to Linotype or Intertype machines and has for its object to provide a new and efficient copyholder measure to facilitate the obtaining of measurements from copy to be set on the machine.

A further object is to provide a measuring attachment to engage over the copyholder finger and permit quick and easy measurements of copy to be set up, and which device is provided with double edges for different measurements, one from right to left, and the other from left to right.

The measure is designed to fit over the finger on the copyholder and can be moved along the finger to obtain different measurements. Heretofore, a separate pica measure has been used that is not a part of the machine and which necessitated many extra movements, and waste of time. Quite often one small piece of copy will have as many as a dozen different measures. With my device these extra movements and waste of time are all eliminated and the measure is always ready for use and in place for such use.

In the drawing in which I have shown my invention:

Figure 1:
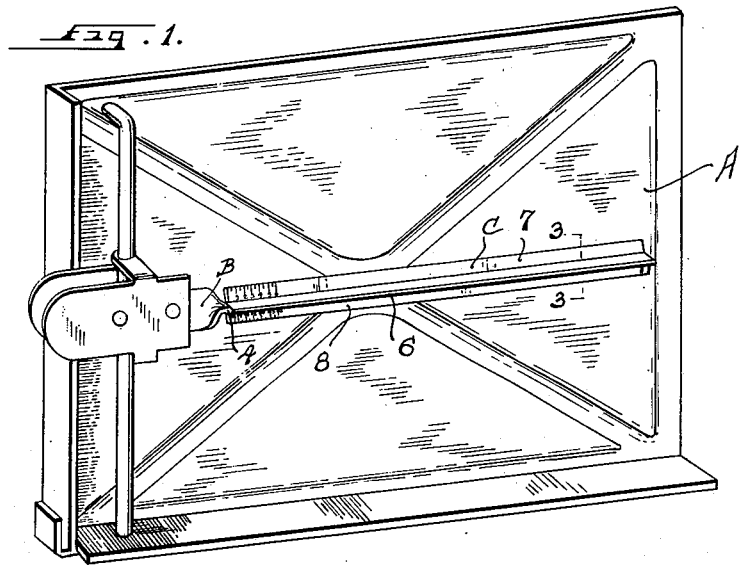
Figure 1 is a perspective view of the entire copyholder from one of the commercial machines termed the "Intertype," and shows my device in place on the copyholder finger.
Figure 2:
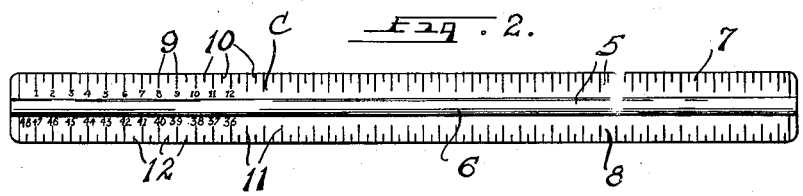
Figure 2 is a plan view of my measure removed from the copyholder finger.
Figure 3:
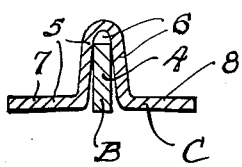
Figure 3 is a section on line 3—3 of Figure 1.

In the drawing I have shown the copyholder as A, the holding finger as B, and onto the vertical area of this finger my measure C is placed. This measure consists of a body 5 having a longitudinal channel 6 formed its entire length with the flat surfaces 7 and 8 of the body at substantially right angles to the side walls of the channel but, with the bottoms of said surfaces slightly curved so that the edges thereof engage the copy.

Along the top face of the surface 7 I provide the rule marked off in picas 9 and half picas 10 with numerals running from 1 to 48 from left to right and along the bottom surface 8 running from right to left the rule is marked off with like marks—11 for the picas and 12 for the half picas. Thus, the markings from the top run from a vertical line having no numeral to the next full line showing a numeral "1" therebelow and this is continued with each pica marked and numbered in sequence as a ruler.

Along the bottom they are reversed and run from right to left. Thus, the operator may measure from either side of the copy desired, as using the lower figures obviates the necessity of moving the ruler or measure to the extreme right to obtain measurements on that side.

To operate the measure it is pressed over the vertical edge 4 of the finger B and the copy placed under the finger and measure rule. When the measure is in place it rests directly on the copy and as the copyholder finger is movable up and down the operator has the measure constantly in sight on every line that is being set up by the machine. This not only saves time but eliminates any tendency of the operator at guessing the measure of certain lines thus producing better copy.

In correcting proofs composed of twin slugs or butted work it is necessary to find the center or place in the line where the slugs come together; and measuring each line to be corrected or drawing a line down the center of the page is unnecessary with the use of this measuring rule as the center of the line is automatically given.

Having thus described my invention I desire to secure by Letters Patent and claim:

1. A measure rule for attachment onto the copy finger of type printing machines comprising, a rule having both sides marked off into predetermined degrees of measurement with the numerals on the upper side running from one upward and the numerals on the lower side starting from the right running from one upward; and a longitudinal channel tapering from wide at the bottom to narrower at the top to fit down over the copy finger to secure the rule to the copy finger.

2. A measuring rule for type setting machines comprising, a rule formed of two flat sides spaced apart by vertical walls forming a longitudinal channel tapered from slightly wider at the bottom to narrower at the top of the channel, with the two flat sides marked off into pica and half pica measurements for measuring the width of copy and with the bottom of the entire device in cross section slightly arcuate.

3. A device for measuring copy for type setting machines to fit onto the copy finger of said machines comprising, a rule formed of two flat sides spaced apart by a vertical longitudinal finger engaging body, said body having means to grip the finger and hold the device in place by frictional engagement thereon, with the two flat sides marked off into measurements with the numerals on the upper flat side starting from the left end running from one upward and the numerals on the lower flat side starting from the right end running from one upward.

COVEL WOODY.